Patented Apr. 20, 1943

2,316,964

UNITED STATES PATENT OFFICE 2,316,964

MASTIC COMPOSITION AND METHOD OF PREPARING SAME

Paul Vincent McKinney and Milo Glenn Mayberry, Pittsburgh, Pa., assignors to The Pure Oil Company, Chicago, Ill., a corporation of Ohio No Drawing. Application October 23, 1939, Serial No. 300,896

5 Claims. (Cl. 260—18)

This invention relates to compositions suitable for use as mastics, binders, jointing material, expansion joints, protective coatings, floor coverings and the like and to the method of preparing the same.

It is well known that in the refining of gasoline produced by cracking hydrocarbon oils and in the refining of gasoline or similar boiling material produced by the conversion or polymerization of hydrocarbon gases, various polymerizing catalysts such as fuller's earth or similar adsorptive catalytic clays are contacted with the gasoline or similar material at elevated temperatures in order to selectively polymerize and remove from the gasoline diolefins which constitute the gum forming and color imparting constituents. For example, in the well known Gray Process cracked gasoline vapors are passed through a tower containing a bed of catalytic clay at temperatures ranging from approximately 150° F. to 400° F. and the resulting polymers are withdrawn in a liquid state from the bottom of the tower. In another method of refining cracked distillates, distillates are either mixed with comminuted catalytic clay under sufficient pressure to maintain the gasoline in substantially liquid state at temperature of approximately 400° F. to 600° F. or the gasoline is passed through a chamber packed with catalytic clay, under these conditions. The resulting polymers are separated from the gasoline by fractional distillation. The polymers produced in the manner set forth form the starting material for the compositions which are hereinafter claimed and disclosed.

Polymers suitable for use in the compositions forming the subject matter of this invention may be prepared by other methods of selective refining of cracked distillates such as, for example, treatment with dilute sulfuric acid or treatment with concentrated sulfuric acid at freezing temperatures, all of which are well known in the art.

Various uses have been heretofore suggested for these polymers. At the present time they are being widely used in core oil compositions, in paint and varnish compositions and as a binder in composition wall boards. These polymers have also been combined with sulfur and used as an additive for extreme pressure lubricants.

We have discovered that if hydrocarbon polymers of the nature of those above described are chemically combined with sulfur under certain conditions such that the resulting product is meltable, and the product is then properly compounded with a factice, a mastic can be prepared which has properties which make it eminently suited for a wide variety of purposes.

In accordance with our invention, hydrocarbon polymers produced in the manner above set forth are preferably reduced under vacuum and/or with steam under non-cracking conditions in order to drive off low boiling material, until the polymer has a solid content as determined by the A. S. T. M. method for varnish, in excess of 60 and preferably in excess of 80. The polymer preferably has an iodine number (Wijs) in excess of 190 and as high as 300 and a molecular weight between approximately 300 and 500. The reduced polymer is then mixed with sulfur and heated for a period of time which may vary from approximately four to fifteen hours at temperatures ranging from approximately 90° C. to 150° C. The reaction between sulfur and polymer begins slightly above 90° C. By maintaining the temperature not substantially above 150° C., a product which is meltable, as distinguished from a vulcanized product, is obtained. The particular time and temperature of reaction will depend on the nature of the final product desired, the longer time of cooking and the higher temperature producing a harder end product. The sulfur may be combined with the polymer in proportions of from approximately 15% to 45% but preferably 25–40% by weight of sulfur to 85% to 55% by weight of polymer. Catalysts such as sulfur chloride or phosphorus pentasulfide may be used but the reaction proceeds satisfactorily without them.

Sulfurized polymers as just described are disclosed and claimed in application, Serial No. 307,812.

After the polymer is sulfurized it is melted and mixed with a suitable organic gel such as sulfurized linseed, China-wood, fish, cottonseed, castor, soy bean or perilla oil, commonly known as factices. Sulfurization of these oils produces gels which may be incorporated in various amounts with the sulfurized polymer to give a finished product of the desired characteristics of toughness, plasticity and hardness. Other types of organic gels which have properties similar to factice, for example, "Linoxyn," may be used instead of factice. "Linoxyn" is a commercial solidified oil prepared by the slow oxidation of linseed oil. It is desirable to mix with the factice and sulfurized polymer various fillers such as whiting, asbestos, silica or slate flour in order to obtain desired degrees of hardness and toughness, and it may also be desirable to mix with the product pigments such as chrome green, red oxide of iron or carbon black in order to obtain a desired color. The factice is mixed with the sulfurized polymer by a suitable means, as for example, an internal type mixer or rubber rolls, and the mixing is carried out at a temperature at which the sulfurized polymer will melt, but at a temperature below 130° C., in order to prevent reaction or decomposition of the materials being processed. The mixture preferably should contain between 20–30% of sulfurized polymer, 10–15% of factice, 30–50% of asbestos and the remainder other filler such as whiting, clay, silica or slate. For some types of products, organic materials may be substituted for the mineral fillers. For example, wood flour may be substituted for whiting and cellulosic waste or ground cork or wood may be substituted for asbestos. In such cases the weight per cent of filler will be decreased, due to the greater bulk and adsorptive capacity of the organic materials.

In order to better understand the invention, the following examples are recited showing how the sulfur polymer is prepared:

Example I 70 parts by weight of polymer were mixed with 30 parts by weight of sulfur and the two were heated together for a period of 5.7 hours during which the temperature was gradually raised from 90° C. to 140° C. at the rate of approximately 10 degrees per hour. During the heating, evolution of hydrogen sulfide was noted. Upon analysis it was found that the resulting product contained 28.87% of sulfur. It had an A. S. T. M. penetration in millimeters of 5.6 and an A. S. T. M. softening point of 64.2° C. The product was hard and brittle.

The polymer used in the preparation of this material was a viscous liquid having the following characteristics:

| | |
|---|---|
| Gravity A. P. I | 10–11 |
| Flash | 230° F. minimum |
| Fire | 280° F. minimum |
| Viscosity at 210° F | 225–300 |
| Pour | Approximately 45° F. |
| Iodine number (Wijs) | 200 minimum |
| Molecular weight | Approximately 425 |
| Per cent solids (A. S. T. M. for varnish) | 80–85 |

The polymer was miscible in all proportions with solvent naphtha.

Example II

The same polymer as used in Example I was mixed with sulfur in the ratio of 30 parts of sulfur to 70 parts by weight of polymer and the mixture was gradually raised from a temperature of 90° C. to 132° C. over a period of 4.8 hours. The resulting product had an A. S. T. M. penetration in millimeters of 15.7, an A. S. T. M. softening point of 60.9° C. and was slightly soft and plastic.

Example III

The same polymer as used in Example I was mixed with sulfur in the proportion of 29.7 parts of sulfur to 69.4 parts of polymer by weight and the two were reacted in the presence of 0.9% sulfur (monochloride) for a period of 4.8 hours during which time the temperature was gradually raised from 90° C. to 126° C. The resulting product had an A. S. T. M. penetration in millimeters of 6.2 and an A. S. T. M. softening point of 63° C.

Example IV

The same polymer as used in Example I was mixed with sulfur in the proportion of 70 parts of polymer to 30 parts by weight of sulfur and the two materials were heated for a period of 7 hours during which the temperature was gradually raised from 95° C. to 135° C. The resulting product had an A. S. T. M. penetration in millimeters of 2.8, an A. S. T. M. softening point of 63° C. and was hard and brittle.

Up to 40% of sulfur will chemically combine with the polymer used in the foregoing examples. When an attempt was made to incorporate 50% of sulfur it was found that free sulfur was present in the composition in dissolved form.

In the preparation of mastics from the foregoing sulfurized polymers, factices were used, prepared by sulfurization of linseed, China-wood and bodied fish oil. In each case 70 parts by weight of the oil was mixed with 30 parts of sulfur and the mixture heated with stirring to a temperature just below 130° C. until the reaction product became too viscous to stir. The factices prepared in this manner were mixed with the sulfurized polymer on mixing rolls in varying amounts in order to obtain products with different characteristics. The following examples illustrate specific compositions which were made:

Example V 21.6% by weight of the sulfurized polymer made in accordance with Example I was mixed with 10.8% of a factice made from linseed oil in the manner previously described. After these two materials were thoroughly mixed, 18.9% of whiting and 48.6% of asbestos were added and thoroughly mixed in the product. The mixing was carried out at a temperature between 110–130° C. The resulting product was tough and plastic.

Example VI 24.2% by weight of sulfur polymer made in accordance with Example II was mixed with 12.1% of linseed oil factice at temperatures of 110–130° C. To the mixture was added 21.2% of whiting and 42.4% of asbestos. This material was fairly tough and plastic.

Example VII 25.8% of sulfurized polymer made in accordance with Example II was mixed with 12.9% of factice prepared from fish oil and to the mixture was added 22.6% of whiting and 38.7% of asbestos. The resulting product was tough and plastic and was admirably suited for the making of floor coverings.

Example VIII 21.3% of sulfurized polymer made in accordance with Example II was mixed with 10.7% of factice prepared from linseed oil. To the mixture was added 18.6% of whiting, 47.9% of asbestos and approximately 1.5% of red oxide of iron in order to give the product a red color. The resulting product was plastic and slightly soft.

Example IX 22.8% of sulfurized polymer made in accordance with Example II was mixed with 11.4% of linseed oil factice, 20% of whiting and 45.8% asbestos. The product was fairly tough and plastic.

Example X 21.6% of sulfurized polymer made in accordance with Example II was mixed with 10.8% of linseed oil factice, 18.9% whiting, 45.9% asbestos and 2.7% of carbon black in order to color the product black. The resulting composition has a good consistency and was tough and plastic.

Example XI 26.6% of sulfurized polymer made in accordance with Example II was mixed with 10% of China-wood factice, 23.3% whiting and 40% asbestos. This composition was tough and plastic.

Example XII 27.5% sulfurized polymer made in accordance with Example III was mixed with 13.7% linseed oil factice, 24% whiting and 34.8% asbestos. The resulting product was tough and slightly soft.

Example XIII 22.6% of sulfurized polymer made in accordance with Example IV was mixed with 12.3% linseed oil factice, 17.9% whiting and 47.2% asbestos. This composition was tough but slightly soft.

Sulfurized polymer, which forms one of the ingredients of applicant's composition, may range from a liquid to a meltable, hard, brittle solid breaking with a conchoidal fracture, depending upon the percentage of sulfur used and the temperature and time of reaction. The larger the amount of sulfur, the harder and more brittle the product. High temperatures and longer times of reaction also tend to produce harder and more brittle products, whereas the short reaction time and/or low temperature tends to produce a soft product. The sulfurized polymer is completely soluble in hydrocarbon solvents such as toluene and benzene, chlorinated hydrocarbons such as carbon tetrachloride and ethylene chloride, and higher aliphatic ketones such as methyl amyl ketones.

The properties of the final product—that is, the sulfurized polymer mixed with the factice and/or filler—depend upon the hardness of the sulfurized polymer and the amount of filler used—particularly asbestos. With soft sulfurized polymer a greater amount of asbestos is required to give the final product the desired toughness. The presence of too much asbestos, however, produces a product which is very stiff and which will not stick together due to the lack of sufficient binder (sulfurized polymer). The best products are those containing 25% to 30% of sulfurized polymer and 35% to 40% of asbestos. The flammability of the final product as determined by the flammability test for tile given in the Federal Specifications for asphalt and tile, indicates that the material will burn less than thirty seconds when sufficient filler is present therein. The sample which contained the chrome green pigment burned for less than thirty seconds.

The compositions prepared in accordance with our invention are highly resistant to corrosion from acids and alkalis.

It will be seen, therefore, that the compositions made in accordance with our invention are useful for a great many purposes and the consistency of the product can be varied within wide limits to make it suitable for the purpose intended.

We claim:

1. The method of preparing a mastic composition which comprises mixing with sulfurized polymer, prepared by heating a mixture of sulfur and hydrocarbon polymer resulting from the selective polymerization by means of catalytic clay of gum-forming and color-imparting bodies in petroleum hydrocarbon distillates, to a temperature sufficiently high within the range of 90° to 150° C. for a period of time, between 4 and 15 hours, sufficient to produce a chemical reaction product containing from 15 to 45% by weight of sulfur which upon cooling forms a hard solidified mass, a factice, and filler at a temperature above the melting point of said sulfurized polymer until a homogeneous mixture is obtained.

2. Method in accordance with claim 1 in which the mastic composition contains between 10-15% of factice.

3. Method in accordance with claim 1 in which the mastic composition contains between 20-30% of sulfurized polymer, 10-15% factice, 30-50% or asbestos and the remainder other filler.

4. A tough, plastic, mastic composition prepared in accordance with the method of claim 1.

5. A tough, plastic, mastic composition prepared in accordance with the method of claim 1 and containing from 20-30% of sulfurized polymer, 10-15% of factice and the remainder filler.

PAUL V. McKINNEY.
M. GLENN MAYBERRY.